United States Patent
Harumoto et al.

(10) Patent No.: US 8,655,527 B2
(45) Date of Patent: Feb. 18, 2014

(54) FUEL-SAVING DRIVING DIAGNOSTIC DEVICE, FUEL-SAVING DRIVING DIAGNOSTIC SYSTEM, CONTROL DEVICE OF ELECTRIC DRIVE DEVICE, FUEL-SAVING DRIVING RATING DEVICE, AND FUEL-SAVING DRIVING DIAGNOSTIC METHOD

(75) Inventors: Satoshi Harumoto, Kobe (JP); Kouei Kiyo, Kobe (JP); Shojiro Takeuchi, Tokyo-to (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 329 days.

(21) Appl. No.: 13/002,233

(22) PCT Filed: Jul. 21, 2009

(86) PCT No.: PCT/JP2009/063047
§ 371 (c)(1),
(2), (4) Date: Dec. 30, 2010

(87) PCT Pub. No.: WO2010/013617
PCT Pub. Date: Feb. 4, 2010

(65) Prior Publication Data
US 2011/0125357 A1 May 26, 2011

(30) Foreign Application Priority Data

Jul. 31, 2008 (JP) ................................. 2008-198382

(51) Int. Cl.
*B60L 11/02* (2006.01)
*B60K 6/20* (2007.10)

(52) U.S. Cl.
USPC .......... 701/22; 701/123; 340/439; 180/65.21; 180/65.265

(58) Field of Classification Search
USPC .............. 701/22, 123, 36, 461; 340/439, 438, 340/455, 459; 180/65.21, 65.265
See application file for complete search history.

(56) References Cited

U.S. PATENT DOCUMENTS

| | | | |
|---|---|---|---|
| 6,201,312 B1 * | 3/2001 | Shioiri et al. ............... | 290/40 C |
| 6,600,413 B1 * | 7/2003 | Lo .................................. | 340/439 |
| 7,853,391 B2 * | 12/2010 | Komeda et al. .................. | 701/99 |
| 7,898,405 B2 * | 3/2011 | Burke et al. .................. | 340/461 |
| 8,195,350 B2 * | 6/2012 | Jinno .............................. | 701/22 |

(Continued)

FOREIGN PATENT DOCUMENTS

| JP | A-5-189698 | 7/1993 |
|---|---|---|
| JP | A-2007-210487 | 8/2007 |

(Continued)

OTHER PUBLICATIONS

International Search Report issued in International Application No. PCT/JP2009/063047 on Nov. 2, 2009 (with translation).

(Continued)

Primary Examiner — Christine Behncke
(74) Attorney, Agent, or Firm — Oliff PLC

(57) ABSTRACT

A vehicle power indication status quantity display unit displays on an indicator a vehicle power indication status quantity obtained by dividing the torque required for driving a hybrid vehicle by the upper limit value of the torque that does not excessively increase the fuel consumption. A HV eco zone of the vehicle power indication status quantity display unit is the zone that is determined by the upper limit value and the lower limit value of the HV eco zone that indicates the motor is being effectively used to drive the vehicle. A check is made to determine whether the vehicle power indication status quantity is within the HV eco zone, and, if it is determined to be within the HV eco zone, the driving being performed is diagnosed as fuel-saving driving.

9 Claims, 13 Drawing Sheets

(56) References Cited

U.S. PATENT DOCUMENTS

| | | | |
|---|---|---|---|
| 8,359,152 B2* | 1/2013 | Jinno | 701/123 |
| 2005/0209771 A1* | 9/2005 | Ishiguro | 701/123 |
| 2007/0143002 A1* | 6/2007 | Crowell et al. | 701/123 |
| 2008/0173485 A1* | 7/2008 | Kumazaki et al. | 180/65.2 |
| 2009/0321165 A1* | 12/2009 | Haug | 180/65.275 |

FOREIGN PATENT DOCUMENTS

| | | |
|---|---|---|
| JP | A-2007-253727 | 10/2007 |
| JP | A-2007-256158 | 10/2007 |
| JP | A-2008-55963 | 3/2008 |

OTHER PUBLICATIONS

Written Opinion of the International Searching Authority issued in International Application No. PCT/JP2009/063047 on Nov. 2, 2009 (with partial translation).

International Preliminary Report on Patentability issued in International Application No. PCT/JP2009/063047 on Jun. 3, 2010 (with partial translation).

Office Action issued in Chinese Application No. 200980129275.2 dated Dec. 5, 2012 (with translation).

Jul. 17, 2013 Office Action issued in Chinese Patent Application No. 200980129275.2 (with English translation).

* cited by examiner

FIG.4

| VEHICLE SPEED RANGE [km/h] | | HV ECO ZONE [N·m] | | ECO ZONE [N·m] | |
|---|---|---|---|---|---|
| LOWER LIMIT VALUE | UPPER LIMIT VALUE | LOWER LIMIT VALUE | UPPER LIMIT VALUE | LOWER LIMIT VALUE | UPPER LIMIT VALUE |
| 0 | 10 | a1 | b1 | c1 | d1 |
| 10 | 20 | a2 | b2 | c2 | d2 |
| 20 | 30 | a3 | b3 | c3 | d3 |
| 30 | 50 | a4 | b4 | c4 | d4 |
| 50 | 70 | a5 | b5 | c5 | d5 |
| 70 | 90 | a6 | b6 | c6 | d6 |
| 90 | – | a7 | b7 | c7 | d7 |

FIG.5

| ITEM NUMBER | VEHICLE POWER INDICATION STATUS QUANTITY DIAGNOSIS ITEM | CURRENT VALUE | DIAGNOSIS CONDITION VALUES (INITIAL VALUES) | | DIAGNOSIS CONDITION VALUES (CHANGED VALUES) | |
|---|---|---|---|---|---|---|
| | | | LOWER LIMIT VALUE | UPPER LIMIT VALUE | LOWER LIMIT VALUE | UPPER LIMIT VALUE |
| 1 | VEHICLE POWER INDICATION STATUS QUANTITY [%] | P | P1 | P2 | P3 | P4 |
| ⋮ | ... | ... | ... | | ... | |

FIG.6

| ITEM NUMBER | ECO LAMP LIGHTING DETERMINATION ITEM | CURRENT VALUE | DIAGNOSIS CONDITION VALUES (INITIAL VALUES) | | DIAGNOSIS CONDITION VALUES (CHANGED VALUES) | |
|---|---|---|---|---|---|---|
| 1 | VEHICLE SPEED [km/h] | v | LOWER LIMIT VALUE | UPPER LIMIT VALUE | LOWER LIMIT VALUE | UPPER LIMIT VALUE |
| | | | v1 | v2 | v3 | v4 |
| 2 | ACCELERATOR OPENING [deg] | θ | LOWER LIMIT VALUE | UPPER LIMIT VALUE | LOWER LIMIT VALUE | UPPER LIMIT VALUE |
| | | | θ1 | θ2 | θ3 | θ4 |
| 3 | SHIFT LEVER POSITION | D RANGE | D RANGE | | D RANGE OR B RANGE | |
| 4 | SHIFT MODE STATE | NORMAL MODE | NORMAL MODE OR ECO MODE | | NORMAL MODE, ECO MODE, OR SNOW MODE | |
| ⋮ | ... | ... | ... | | ... | |

FIG.7

| OVERRUN RANK | HV ECO ZONE RANGE OVERRUN RATE [%] | | WEIGHTING COEFFICIENT |
|---|---|---|---|
| | LOWER LIMIT VALUE | UPPER LIMIT VALUE | |
| A | 0 | 10 | α1 |
| B | 10 | 40 | α2 |
| C | 40 | – | α3 |

FIG.8

| SCORE OF ECO LAMP LIGHTING TRAVELING SCORE OF TRAVELING WITHIN HV ECO ZONE RANGE | | EXAMPLE ADVICE |
|---|---|---|
| LOWER LIMIT VALUE [%] | UPPER LIMIT VALUE [%] | |
| 0 | 50 | YOU ARE DRIVING IN A VERY ENVIRONMENTALLY-UNFRIENDLY MANNER. PLEASE TRY TO ECO-DRIVE. |
| 50 | 80 | YOU ARE DRIVING IN AN ENVIRONMENTALLY-FRIENDLY MANNER. PLEASE TRY TO ECO-DRIVE FURTHER. |
| 80 | – | YOU ARE DRIVING IN A VERY ENVIRONMENTALLY-FRIENDLY MANNER. PLEASE CONTINUE TO ECO-DRIVE. |

FIG.9

| SCORE OF TRAVELING BEYOND HV ECO ZONE RANGE | | EXAMPLE ADVICE |
|---|---|---|
| LOWER LIMIT VALUE [%] | UPPER LIMIT VALUE [%] | |
| 0 | 20 | ATTENTION! YOU ARE DRIVING IN AN ENVIRONMENTALLY-UNFRIENDLY MANNER. PLEASE TRY TO ECO-DRIVE. |
| 20 | 60 | CAUTION! YOU ARE DRIVING IN A VERY ENVIRONMENTALLY-UNFRIENDLY MANNER. PLEASE TRY TO ECO-DRIVE. |
| 60 | – | WARNING! YOU ARE DRIVING IN AN EXTREMELY ENVIRONMENTALLY-UNFRIENDLY MANNER. TRY TO ECO-DRIVE. |

SCORE OF ECO LAMP LIGHTING TRAVELING =
SCORE 50

SCORE OF TRAVELING WITHIN HV ZONE RANGE =
SCORE 20

SCORE OF TRAVELING BEYOND HV ZONE RANGE =
SCORE 110

SCORE OF TRAVELING WITHIN HV ZONE RANGE =
SCORE 20

YOU ARE DRIVING IN AN EXTREMELY
ENVIRONMENTALLY-UNFRIENDLY
MANNER.
PLEASE TRY TO ECO-DRIVE.

FIG.16

```
                                                  ⌐16c
┌─────────────────────────────────────────────────┐
│                                                 │
│  SCORE OF TRAVELING BEYOND HV ZONE RANGE =      │
│                  SCORE 110                      │
│                                                 │
│                                                 │
│                   ATTENTION!                    │
│           YOU ARE DRIVING IN AN                 │
│       ENVIRONMENTALLY-UNFRIENDLY                │
│                    MANNER.                      │
│          PLEASE TRY TO ECO-DRIVE.               │
│                                                 │
└─────────────────────────────────────────────────┘
```

FUEL-SAVING DRIVING DIAGNOSTIC DEVICE, FUEL-SAVING DRIVING DIAGNOSTIC SYSTEM, CONTROL DEVICE OF ELECTRIC DRIVE DEVICE, FUEL-SAVING DRIVING RATING DEVICE, AND FUEL-SAVING DRIVING DIAGNOSTIC METHOD

TECHNICAL FIELD

The present invention relates to a fuel-saving driving diagnostic device, a fuel-saving driving diagnostic system, a control device of an electric drive device, a fuel-saving driving rating device, and a fuel-saving driving diagnostic method for diagnosing and rating fuel-saving driving of the driver of a vehicle that has an electric drive device for driving the vehicle using electricity as energy and notifying the rating result to the driver to raise awareness of the fuel-saving driving.

BACKGROUND ART

In recent years, fuel saving characteristics of vehicles are again regarded as important, as the global environmental issues are drawing more attention. As for the global environmental issues, measures need to be promptly taken against global warming. However, there is a limit on fuel reductions achieved by improvements in vehicles with conventional gasoline engines that emit greenhouse gases such as carbon dioxide, and rapid global warming cannot be effectively stopped.

To counter this problem, hybrid vehicles have been developed. A hybrid vehicle normally has a gasoline engine that uses fossil fuel as energy, and a motor that uses electricity as energy. For example, a hybrid vehicle uses a motor as the driving force at the time of low to medium speed driving, and uses a gasoline engine as the driving force at the time of high speed driving.

When running with a motor as the driving force, a hybrid vehicle does not emit exhaust gases at all. Accordingly, a hybrid vehicle has the effect to prevent further global warming, emitting no greenhouse gases. Also, since a motor uses electricity as energy, a motor can achieve higher energy usage efficiency, and realize more fuel saving than a gasoline engine. A fuel saving effect can be measured by measuring distances that can be traveled with the same amount of energy, or the amount of energy consumed to travel the same distance, and using them as indicators.

However, no matter how high the original fuel saving characteristics of the vehicle are, a driver's fuel consuming driving manner can degrade the high fuel saving characteristics of the vehicle. Therefore, there have been various conventional techniques for advising drivers to perform such driving operations as to save as much fuel as possible.

For example, according to a conventional technique, an in-vehicle display device that reports to the driver about how long the driver has performed eco-friendly driving has been suggested. If a travel distance converted into a unit amount with the use of fuel consumed at the present location is determined to be larger than a reference value, the driving of the vehicle is regarded as eco-friendly driving (fuel-saving driving friendly to the global environment; "eco" being an abbreviation of "ecology", which also applies in the descriptions below). When the driving is determined to be eco-friendly driving, the in-vehicle display device subtracts the reference value from the travel distance to calculate an eco numerical value indicating the eco-friendly driving in the form of a numerical value and adding up the eco numerical values.

According to another conventional technique, a hybrid vehicle driving operation evaluating device that reports to the driver about the information as to driving operations in actual driving has been suggested. The hybrid vehicle driving operation evaluating device measures ideal fuel consumption data about each driving pattern in a driving test of a hybrid vehicle. Then, the hybrid vehicle driving operation evaluating device measures actual fuel consumption data for each driving pattern in actual driving of the hybrid vehicle, and evaluates the actual driving based on the difference between the ideal fuel consumption data and actual fuel consumption data.

According to yet another conventional technique, a display device that reports to the driver about the driving efficiency of a hybrid electric vehicle and a method of calculating the driving efficiency to be displayed on the display device have been suggested. The display device displays on an eco-meter a correction value that is calculated by correcting the instantaneous fuel consumption calculated based on the travel distance and the amount of fuel consumption of the hybrid electric vehicle, with the acceleration of the hybrid electric vehicle being a parameter.

According to another conventional technique, a fuel consumption display device that can instantly cause the driver to visually recognize the information about the fuel consumption has been suggested. The fuel consumption display device calculates and displays the information about the fuel consumption from the travel distance and the amount of fuel consumption of the vehicle, and changes the luminance and color of a lamp in accordance with the information about the fuel consumption.

PATENT LITERATURE

Patent Documents

Patent Document 1: Japanese Patent Application Laid-open No. 2008-55963
Patent Document 2: Japanese Patent Application Laid-open No. 2007-210487
Patent Document 3: Japanese Patent Application Laid-open No. 2007-253727
Patent Document 4: Japanese Patent Application Laid-open No. 2007-256158

DISCLOSURE OF INVENTION

Problem to be Solved by the Invention

However, the above conventional techniques have the following problems. A driver cannot make an absolute and fair determination on the information about fuel consumption, based simply on a report of the mean fuel consumption obtained by dividing the travel distance by the amount of fuel consumption, and the information about fuel consumption obtained by calculating the instantaneous fuel consumption per 0.1 second, for example. This is because the driving conditions of a vehicle vary widely with situation, and the driving conditions have a large influence on fuel consumption.

Also, a check can be made to determine whether a current driving situation is good by determining whether the information about fuel consumption exceeds a threshold value, but how good or bad the current driving situation is cannot be determined. Therefore, it is not possible to estimate an allowable range of the trade-off relationship between fuel saving and comfortable driving, when a driver wishes to enjoy pleasant driving while maintaining the fuel consumption within a fuel-saving range, for example.

Because of the above problems, the driver's effort to improve his/her driving operations and awareness about fuel-saving driving cannot be increased, since driving operations of the driver cannot be evaluated based on fair criteria according to the conventional techniques, though, to reduce fuel consumptions, it is necessary to increase the driver's effort to improve his/her driving operations and the driver's awareness of fuel-saving driving.

The fuel-saving driving diagnostic device, the fuel-saving driving diagnostic system, the control device of electric drive device, the fuel-saving driving rating device, and fuel-saving driving diagnostic method disclosed in the following have been made to solve the above problems (issues), and the objects of them are to enable an absolute and fair determination based on the information about fuel consumptions, indicate the allowable range of the trade-off relationship between fuel saving and comfortable driving, and increase the driver's effort to improve his/her driving operations and the driver's awareness of fuel-saving driving.

Means for Solving Problem

To solve the above problems and achieve the above objects, the fuel-saving driving diagnostic device, fuel-saving driving diagnostic system, and fuel-saving driving diagnostic method disclosed in the following involve: calculating a fuel-saving driving condition determined by a control value of an electric drive device with respect to vehicle traveling, based on the performance characteristics of the electric drive device and the vehicle speed of the vehicle; acquiring the control value of the electric drive device with respect to the vehicle traveling; determining whether the control value acquired by a control value acquiring unit satisfies the fuel-saving condition calculated by a fuel-saving driving condition calculating unit; determining whether the control value of the electric drive device with respect to the vehicle traveling satisfies the fuel-saving driving condition, in accordance with acquired road conditions or traffic conditions; rating fuel-saving driving, based on a determination subject travel distance of the vehicle to be subjected to the determination on whether the control value of the electric drive device with respect to the vehicle traveling satisfies the fuel-saving driving condition, and a travel distance determined to satisfy the fuel-saving driving condition in the determination subject travel distance; generating a fuel-saving driving advice based on the rating result; and notifying the driver of the rating result and the fuel-saving driving advice.

Effect of the Invention

The present invention has the effect to enable an absolute and fair determination based on the information about fuel consumptions, particularly the information about acceleration and deceleration, indicate the allowable range of the trade-off relationship between fuel saving and comfortable driving, and increase the driver's effort to improve his/her driving operations and the driver's awareness about fuel-saving driving.

BRIEF DESCRIPTION OF DRAWINGS

FIG. 4 is a diagram illustrating an example of an eco zone table;

FIG. 5 is a diagram illustrating an example of a HV eco zone traveling determining conditions table;

FIG. 6 is a diagram illustrating an example of an eco lamp lighting determining conditions table;

FIG. 7 is a diagram illustrating an example of a HV eco zone range overrun rank weighting coefficient table;

FIG. 8 is a diagram illustrating an example of a fuel-saving driving advice table that stores fuel-saving driving advices in accordance with scores of eco lamp lighting traveling and scores of traveling within the HV eco zone range;

FIG. 9 is a diagram illustrating an example of a fuel-saving driving advice table that stores fuel-saving driving advices in accordance with scores of traveling beyond the HV eco zone range;

FIG. 14 is a diagram illustrating an example of the display formats of a score of eco lamp lighting traveling, a score of traveling within the HV eco zone range, and a score of traveling beyond the HV eco zone range;

FIG. 15 is a diagram illustrating an example of the display format of a fuel-saving driving advice;

FIG. 16 is a diagram illustrating an example of the display format of a fuel-saving driving advice.

BEST MODE(S) FOR CARRYING OUT THE INVENTION

The following is a detailed description of an example of an embodiment concerning a fuel-saving driving diagnostic device, a fuel-saving driving diagnostic system, and a fuel-saving driving diagnostic method, with reference to the accompanying drawings. The vehicle disclosed in the following example of an embodiment is a hybrid vehicle (hereinafter referred to simply as HV) that has both a gasoline engine (or some other engine using fossil fuel as energy) and a drive motor (hereinafter referred to simply as the motor), and runs by switching drive sources in accordance with driving situations.

However, this example of an embodiment may be applied not only to HVs but also to a wide variety of vehicles that run using a motor as the driving force, such as electric vehicles and vehicles powered by a fuel battery. The speed changer mechanism of a vehicle described below is an example of an automatic speed changer mechanism or an infinite variable speed changer mechanism.

First, a fuel-saving driving diagnostic device, a fuel-saving driving diagnostic system, and a fuel-saving driving diagnostic method are briefly described. With the fuel-saving driving diagnostic device, the fuel-saving driving diagnostic system, and the fuel-saving driving diagnostic method disclosed herein, a check is made to determine whether driving being performed is fuel-saving driving by comparing the driving operation states of the HV driver, particularly the driving operation states of acceleration and deceleration, with both an eco range and a HV eco range.

Here, the driving operation state of the driver is the accelerator opening observed at the time of acceleration, and is equivalent to the torque required of the driving source. The eco range is the range with an upper limit value that is the torque that can perform acceleration to such a degree as not to cause an excessive increase in fuel consumption. The HV eco range is the range with an upper limit value that is the torque indicating the limitation of traveling with the motor (HV eco information). The eco range and the HV eco range are both values that vary with vehicle model and vehicle speed. The HV eco range further varies with motor characteristics, motor temperature, and the SOC (State of Charge) of the battery.

While the eco range has "0" as its lower limit value, the HV eco range is a range having a lower limit value that is a negative value varying with vehicle model to clearly indicate power generation by the regeneration brake function of the motor. In other words, the HV eco range indicates the range in which driving is performed by efficiently using the motor, in accordance with the motor characteristics.

Figure 1:
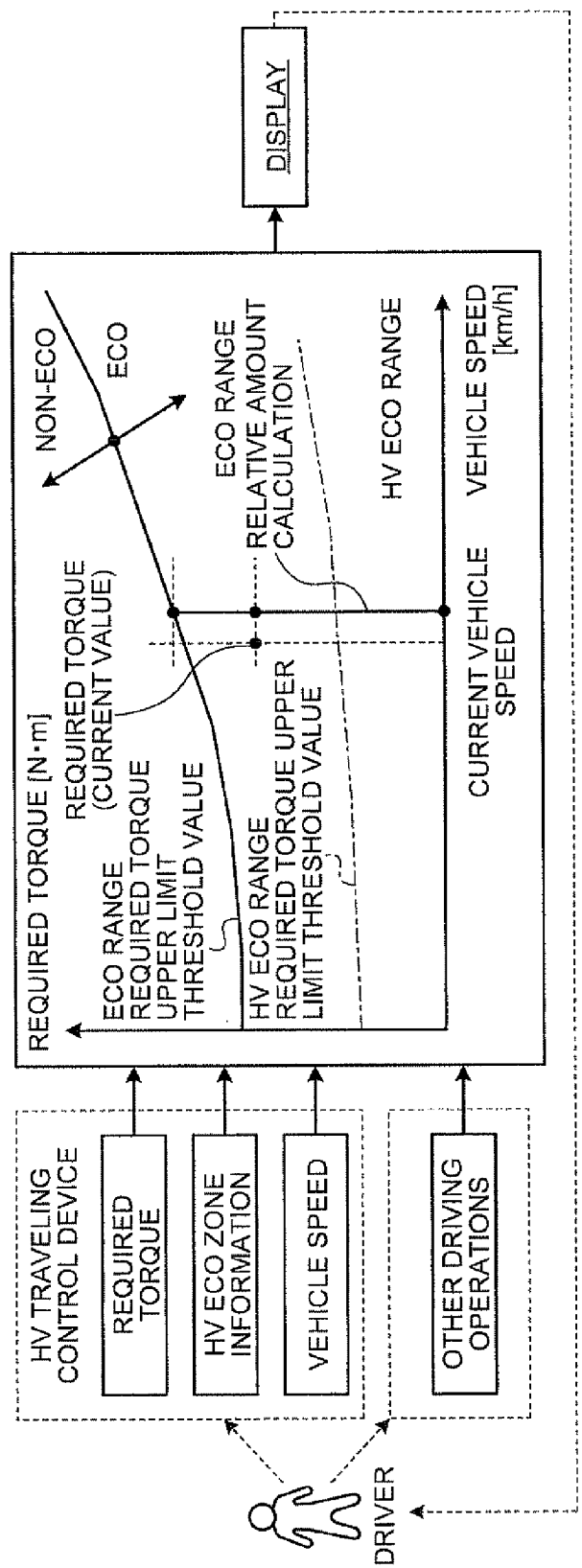
FIG. 1 is an explanatory view for outlining a fuel-saving driving diagnostic device, a fuel-saving driving diagnostic system, and a fuel-saving driving diagnostic method.

As illustrated in FIG. 1, curves of the required torque in the eco range (an upper limit value) and the required torque in the HV eco range (an upper limit value) depending on vehicle speed are mapped based on the required torque, the HV eco zone information, the vehicle speed, and other driving operations, in response to a driving operation of the driver.

Here, the relative amount of the required torque is calculated based on the following equation:

$$\text{Rerative amount of required torque} = \frac{\text{Required torque (current value)}}{\text{Required torque in eco range (upper limit value)}} [\%] \quad (1)$$

Accordingly, the relative amount of the required torque is the percentage of the required torque (the current value) with respect to the required torque in the eco range (the upper limit value) at the current vehicle speed. Here, the required torque in the eco range (the upper limit value) is the upper limit value of the eco range, and this upper limit value is set as 100[%].

Also, the required torque in the HV eco range (the upper limit value) is the upper limit value of the HV eco range, and a percentage where the required torque in the eco range (the upper limit value) is 100[%] is represented by e[%]. If the relative amount of the required torque is equal to or smaller than the required torque in the eco range (the upper limit value) (=100[%]), the current driving operation of the driver is determined to be eco driving. Further, if the relative amount of the required torque is equal to or smaller than the required torque in the HV eco range (the upper limit value (=e[%]), the current driving operation of the driver is determined to be effectively using the motor and be more eco-friendly. This determination result is notified to the driver through a display on a display unit, for example, to improve the fuel-saving driving of the driver.

Varying with vehicle model, motor characteristics, vehicle speed, driving conditions of the vehicle, and the like, the required torque in the HV eco range (the upper limit value) (=e[%]) is approximately 50% of the required torque in the eco range (the upper limit value). Here, acceleration of the vehicle that does not exceed the required torque in the HV eco range (the upper limit value) indicates acceleration performed by effectively using the motor. Therefore, evaluating vehicle traveling within the range of required torque in the HV eco range (the upper limit value) while the later described eco lamp 16b is on is particularly meaningful when the fuel saving characteristics of the driving of the vehicle using the motor as the driving source is evaluated.

Figure 2:
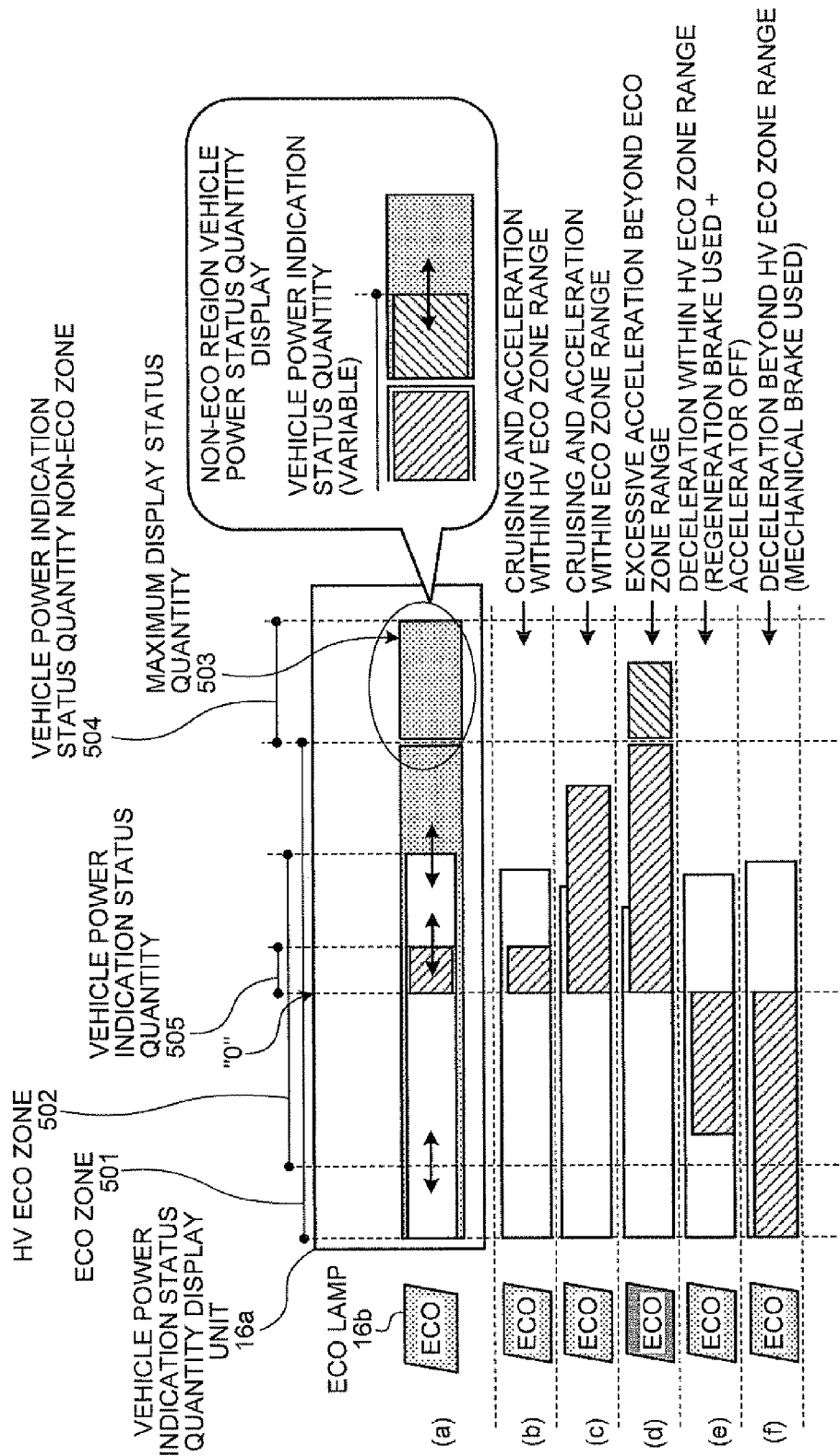
FIG. 2 shows the display formats of an eco lamp and a vehicle power indication status quantity display unit.

Next, the display formats of an eco lamp and a vehicle power indication status quantity display unit are described as an example of a method for notifying the driver of the results of a determination made on the current driving operation of the driver. FIG. 2 is a diagram illustrating the display formats of an eco lamp and a vehicle power indication status quantity display unit.

The eco lamp 16b is a conventional lamp, and is lighted when eco-friendly driving that satisfies various lighting conditions is being performed. Part (d) in FIG. 2 depicts an off state of the eco lamp 16b. The parts other than (d) in FIG. 2 depict on states of the eco lamp 16b.

On the other hand, a vehicle power indication status quantity display unit 16a is an indicator that updates and displays the relative amount of the required torque calculated according to the above equation (1) every 100 milliseconds, for example. In the following, the relative amount of the required torque will be referred to as the vehicle power indication status quantity.

An eco zone 501 of the vehicle power indication status quantity display unit 16a is the zone that is determined by the upper limit value and the lower limit value of the eco range. A HV eco zone 502 is the zone that is determined by the upper limit value and the lower limit value of the HV eco range. A maximum display status quantity 503 is the upper limit on the indicator that is capable of displaying a vehicle power indication status quantity 505.

A vehicle power indication status quantity non-eco zone 504 is the zone extending from the overrun portion beyond the upper limit value of the eco zone 501 to the maximum display status quantity 503. As depicted in (a) of FIG. 2, the upper limit value and the lower limit value of the HV eco zone 502 can vary with vehicle model and vehicle speed. Likewise, the value indicated by the vehicle power indication status quantity 505 can vary with vehicle model and vehicle speed. The ordinate axis indicated by "0" in the figure represents the boundary line between the positive regions and the negative regions of the eco zone 501 and the HV eco zone 502.

For example, the vehicle power indication status quantity 505 depicted in (b) of FIG. 2 is within the HV eco zone 502, and indicates that HV eco driving is being performed with cruising and acceleration within the HV eco zone range. The vehicle power indication status quantity 505 depicted in (c) of FIG. 2 is partially located outside the HV eco zone 502, but is within the eco zone 501. Accordingly, the vehicle power indication status quantity depicted in (c) of FIG. 2 indicates that the driving involves cruising and acceleration within the eco zone range.

The vehicle power indication status quantity 505 depicted in (d) of FIG. 2 is partially located outside the eco zone 501, and indicates that the driving involves excess acceleration beyond the eco zone range. The vehicle power indication status quantity 505 depicted in (e) of FIG. 2 is in the negative region of the HV eco zone 502, and therefore, indicates that the driving involves deceleration within the HV eco zone range (where the regeneration brake of the motor is used, and the accelerator is off).

The vehicle power indication status quantity 505 depicted in (f) of FIG. 2 is partially located outside the negative region of the HV eco zone 502, and therefore, indicates that the driving involves deceleration beyond the HV eco zone range (with the use of a mechanical brake).

To sum up, the conditions under which acceleration or deceleration of the vehicle is determined to be eco-friendly acceleration/deceleration within the HV zone range are that the eco lamp 16b is on, and the vehicle power indication status quantity 505 is in the range of the HV eco zone 502.

As described above, the vehicle power indication status quantity 505 accompanying acceleration or deceleration of the vehicle is displayed on an indicator, so that the driver can readily recognize whether the acceleration or deceleration is eco-friendly, and can have greater awareness about eco-friendly acceleration and deceleration. Also, through the indicator display, it is possible to determine an allowable range of a trade-off relationship between low fuel consumption and pleasant driving when the driver wishes to enjoy comfortable driving (accelerating and decelerating) while keeping the fuel consumption within the fuel-saving range.

Example of an Embodiment

Figure 3:
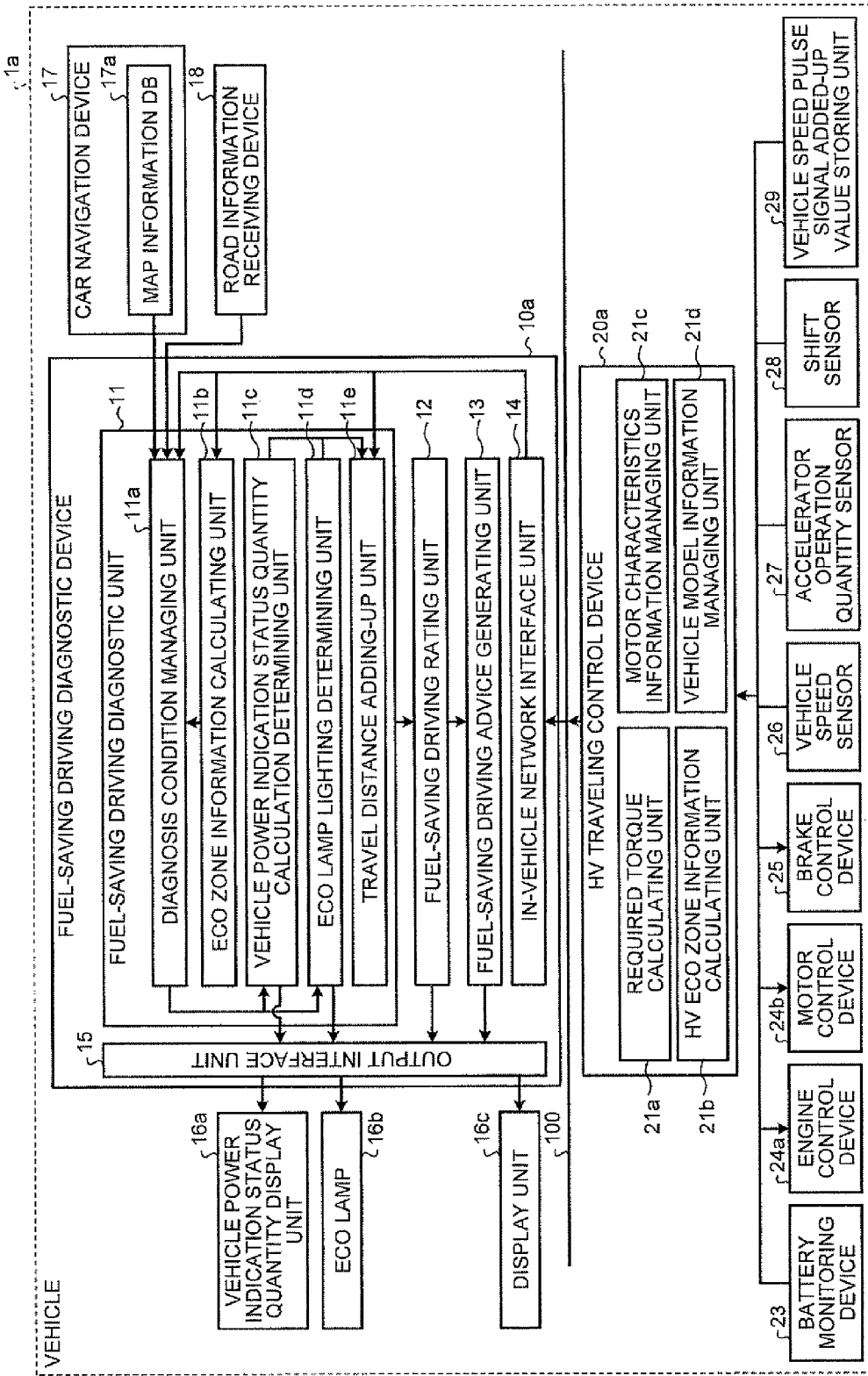
FIG. 3 is a functional block diagram illustrating the structures of components related to a fuel-saving driving diagnostic device and a HV traveling control device according to an example of an embodiment.

Referring to FIGS. 3 through 16, an example of an embodiment concerning a fuel-saving driving diagnostic device, a fuel-saving driving diagnostic system, and a fuel-saving driving diagnostic method is described. FIG. 3 is a functional block diagram illustrating a structure related to a fuel-saving driving diagnostic device 10a and a HV traveling control device 20a of a vehicle 1a according to the example of an embodiment.

As illustrated in FIG. 3, the fuel-saving driving diagnostic device 10a includes a fuel-saving driving diagnostic unit 11, a fuel-saving driving rating unit 12, a fuel-saving driving advice generating unit 13, an in-vehicle network interface unit 14, and an output interface unit 15. Also, the fuel-saving driving diagnostic device 10a is connected to the HV traveling control device 20a via the in-vehicle network interface unit 14 and an in-vehicle network 100. The HV traveling control device 20a is a computer that performs HV traveling control, and includes a required torque calculating unit 21a, a HV eco zone information calculating unit 21b, a motor characteristics information managing unit 21c, and a vehicle model information managing unit 21d.

Also, a battery monitoring device 23 that monitors the state of a battery that accumulates power to be supplied to the motor for driving the vehicle is connected to the HV traveling control device 20a. An engine control device 24a that controls the gasoline engine for driving the vehicle, and a motor control device 24b that controls the motor for driving the vehicle are also connected to the HV traveling control device 20a.

A brake control device 25 is also connected to the HV traveling control device 20a. The brake control device 25 controls the mechanical brake in accordance with brake operations by the driver, and performs control so as to use the motor as a regeneration brake in accordance with shift lever operations of the driver.

Also, a vehicle speed sensor 26 that senses the current speed of the vehicle, an accelerator operation quantity sensor 27 that senses the current quantity of the accelerator operation of the driver, a shift sensor 28 that senses the current shift lever position of the vehicle and the current shift mode state of the vehicle, and a vehicle speed pulse signal added-up value storing unit 29 are connected to the HV traveling control device 20a.

The vehicle speed pulse signal added-up value storing unit 29 stores a vehicle speed pulse signal added-up value that is incremented by 1 every time a pulse sensor provided on the inner diameter of each wheel of the vehicle 1a senses a vehicle speed pulse signal as the wheel rotates 360 degrees. In other words, the vehicle speed pulse signal added-up value is a value obtained by accumulating the number of rotations of the wheel. The travel distance of the vehicle 1a in a predetermined period of time (100 milliseconds, for example) can be calculated by calculating the difference in vehicle speed pulse signal added-up values obtained before and after the predetermined period of time passes, and multiplying the difference by the outer circumference of the wheel.

The required torque calculating unit 21a of the HV traveling control device 20a calculates the required torque for accelerating the vehicle 1a in accordance with the quantity of the accelerator operation (the accelerator opening) conducted by the driver and sensed by the accelerator operation quantity sensor 27.

The HV eco zone information calculating unit 21b of the HV traveling control device 20a calculates HV eco zone information in accordance with the vehicle speed, based on motor characteristics obtained from the motor characteristics information managing unit 21c, vehicle model information obtained from the vehicle model information managing unit 21d, the motor temperature monitored by the motor control device 24b, and the SOC of the battery monitored by the battery monitoring device 23.

The HV eco zone information indicates the lower limit value and the upper limit value that define the HV eco range of the required torque at each vehicle speed.

The HV eco zone information calculated by the HV eco zone information calculating unit 21b is transferred to a diagnosis condition managing unit 11a of the fuel-saving driving diagnostic device 10a. The diagnosis condition managing unit 11a stores the HV eco zone information as the lower limit values and the upper limit values at the respective vehicle speeds in the HV eco zone columns in an eco zone table depicted in FIG. 4. The values stored in the eco zone columns of the eco zone table are calculated by an eco zone information calculating unit 11b as described above and are then stored.

The vehicle power indication status quantity display unit 16a, the eco lamp 16b, and a display unit 16c having a display screen are connected to the fuel-saving driving diagnostic device 10a via the output interface unit 15.

The fuel-saving driving diagnostic unit 11 includes the diagnosis condition managing unit 11a, the eco zone information calculating unit 11b, a vehicle power indication status quantity calculation determining unit 11c, an eco lamp lighting determining unit 11d, and a travel distance adding-up unit 11e.

The diagnosis condition managing unit 11a manages the conditions under which driving is determined to be eco driving in the HV eco zone, and the conditions under which the vehicle power indication status quantity is in the HV eco zone range, and the eco lamp 16b is put into a lighting state. Specifically, the eco zone table depicted in FIG. 4, a HV eco zone traveling determining conditions table depicted in FIG. 5, and an eco lamp lighting determining conditions table shown in FIG. 6 are stored.

The eco zone table depicted in FIG. 4 stores the lower limit value and the upper limit value of the HV eco zone of each vehicle speed range calculated by the HV eco zone information calculating unit 21b. The eco zone table also stores the lower limit value and the upper limit value of the eco zone of each vehicle speed range calculated by the later described eco zone information calculating unit 11b, based on the vehicle model information. In FIG. 4, ai, bi, ci, and di are compatible values that satisfy the relationship: ci<ai<bi<di (i=1, 2, . . . , 7).

The HV eco zone traveling determining conditions table depicted in FIG. 5 has vehicle power status indication quantity [%] and the like stored as the determination items for determining whether the traveling is within the HV eco zone range. The HV eco zone traveling determining conditions table stores the current values of the respective determination items, the diagnosis condition values (initial values), and diagnosis condition values (changed values).

The current value P of the vehicle power indication status quantity in the HV eco zone traveling determining conditions table is the value obtained by dividing the required torque calculated by the required torque calculating unit 21a of the HV traveling control device 20a every 100 milliseconds by the upper limit value di (i being one of 1 through 7 in accordance with the current vehicle speed) of the eco zone of the current vehicle speed, referring to the eco zone table.

The diagnosis condition values (the initial values) in the HV eco zone traveling determining conditions table are values calculated for each vehicle speed by the HV eco zone information calculating unit 21b, based on the upper limit value of the eco zone information, the motor characteristics, the vehicle model information, and the remaining battery level monitored by the battery monitoring device 23.

The diagnosis condition values (changed values) are values changed from the diagnosis condition values (the initial values) by the diagnosis condition managing unit 11a, based on map information supplied from a map information DB 17a of a car navigation device 17, and road conditions and traffic conditions received by a road information receiving device 18. The diagnosis condition values (the changed values) serve as values that relax or tighten the diagnosis condition values (the initial values).

The road information receiving device 18 is a VICS (registered trademark) receiving device or a DSRC (Dedicated Short Range Communications; road-to-vehicle communications) device.

The eco lamp lighting determining conditions table depicted in FIG. 6 has the vehicle speed [k/m], the accelerator opening (the angle of the accelerator opening conducted by the driver) θ [deg], the shift lever position, the shift mode state, and the like stored as the determination items for allowing the eco lamp 16b to light up. The eco lamp lighting determining conditions table stores the current values of the respective determination items, the diagnosis condition values (the initial values), and the diagnosis condition values (changed values).

The current value v of the vehicle speed, the current value θ of the accelerator opening, the shift lever position, and the shift mode state in the eco lamp lighting determining conditions table are values that are acquired from the vehicle speed sensor 26, the accelerator operation quantity sensor 27, and the shift sensor 28 via the NV traveling control device 20a every 100 milliseconds, for example.

The shift lever position is "P" (Parking), "R" (Reverse), "D" (Drive; normal drive), "N" (Neutral), "B" (Break; regenerative braking by the motor), "2" (Second; second gear position), "1" (First: first gear position), or the like. Normally, "D" is selected as the shift lever position for driving, to realize fuel-saving driving.

The shift mode state is a function to complement the shift lever selection and set the driving of the vehicle 1a, and this function can be switched on and off with a switch attached to the shift lever. The shift mode state is a "normal mode", an "eco mode" (a state where fuel-saving driving is performed), a "sport mode" (a state where sporty-type driving is performed), a "snow mode" (a state where safe driving is secured in the snow), or the like. Normally, the "normal mode" or the "eco mode" is selected as the shift mode state for driving, to perform fuel-saving driving.

The diagnosis condition values (the initial values) in the eco lamp lighting determining conditions table are values that are set in advance. The diagnosis condition values (changed values) are values changed from the diagnosis condition values (the initial values) by the diagnosis condition managing unit 11a, based on map information supplied from the map information DB 17a of the car navigation device 17, and road conditions and traffic conditions received by the road information receiving device 18. The diagnosis condition values (the changed values) serve as values that relax or tighten the diagnosis condition values (the initial values).

The reason that the diagnosis condition managing unit 11a relaxes or tightens the diagnosis condition values in accordance with the map information and the road and traffic conditions as described above is as follows. The indication and lighting of the vehicle power indication status quantity display unit 16a and the eco lamp 16b are information that indicates fuel-saving driving of the driver. When a check is made to determine whether the driving of the driver is eco-driving based on the indication state and the lighting state of the vehicle power indication status quantity display unit 16a and the eco lamp 16b, a fair determination cannot be made if the road environment or the traffic conditions in which the vehicle 1a is running are not taken into consideration.

For example, when the vehicle 1a goes uphill, a larger torque than the torque required for flatland driving is required for acceleration. At a junction of roads, it is necessary to accelerate considerably, so as to follow the vehicles running on the main lane.

As described above, if a determination is made on driving by not taking into consideration the conditions of the driving point where the vehicle 1a is running, advantages and disadvantages are caused when the driving is rated (evaluated) based on the determination results, and unfair rating is performed. To eliminate the unfairness, the diagnosis condition managing unit 11a relaxes or tightens the diagnosis condition values in accordance with the map information and road and traffic conditions, to perform fair diagnoses and rating, and satisfy the user who is the driver.

Relaxing or tightening the diagnosis condition values in accordance with the map information and road and traffic conditions is realized by shifting the lower limit value and the upper limit values represented by numerical values by 20 to 30%, and/or adding or deleting a condition with respect to the shift lever position and the shift mode state.

Based on the vehicle model information transferred from the HV traveling control device 20a, the eco zone information calculating unit 11b calculates the eco zone information that contains the information about the upper limit value of the torque that can achieve acceleration without an excessive increase in fuel consumption at each vehicle speed even if a gasoline engine is used. Like the HV eco zone information, the eco zone information has the lower limit value and the upper limit value at each vehicle in the eco zone column in the eco zone table.

The vehicle power indication status quantity calculation determining unit 11c calculates the vehicle power indication status quantity by dividing the required torque T at the current vehicle speed v calculated by the required torque calculating unit 21a by the upper limit value (see FIG. 4) of the eco zone at the corresponding vehicle speed calculated by the eco zone information calculating unit 11b. The calculated vehicle power indication status quantity is displayed on the vehicle power indication status quantity display unit 16a. The vehicle power indication status quantity is the relative amount of the required torque calculated according to the above equation (1).

The vehicle power indication status quantity calculation determining unit 11c then determines whether the calculated vehicle power indication status quantity is within the range of the lower limit value to the upper limit value of the diagnosis condition value (changed value) for the vehicle power indication status quantity shown in FIG. 5. When the vehicle power indication status quantity is within the range of the lower limit value to the upper limit value of the diagnosis condition values (changed values), driving is determined to be HV eco driving. This determination is called a fuel-saving driving diagnosis.

If the road conditions and the traffic conditions are in normal states, the vehicle power indication status quantity calculation determining unit 11c determines whether the calculated vehicle power indication status quantity is within the range of the lower limit value to the upper limit value of the diagnosis condition values (the initial values) for the vehicle power indication status quantity shown in FIG. 5.

The eco lamp lighting determining unit 11d determines whether the current vehicle speed, the accelerator opening, the shift lever position, and the shift mode state (these will be referred to as the eco lamp lighting determination items) of the vehicle 1a acquired via the HV traveling control device 20a satisfy the respective diagnosis condition values (changed values) illustrated in FIG. 6. This determination is also a fuel-saving driving diagnosis. When all the eco lamp lighting determination items satisfy the diagnosis condition values (changed values), the eco lamp lighting determining unit 11d lights the eco lamp 16b.

When the road conditions and the traffic conditions are in normal states, the eco lamp lighting determining unit 11d determines whether the eco lamp lighting determination items are within the ranges of the lower limit values to the upper limits values of the respective diagnosis condition values (the initial values) illustrated in FIG. 6.

The travel distance adding-up unit 11e adds the 100-msec travel distance acquired from the vehicle speed pulse signal added-up value storing unit 29 via the HV traveling control device 20a every 100 milliseconds to a one-trip travel distance, an eco lamp lighting travel distance, a travel distance within the HV eco zone range, and a travel distance beyond the HV eco zone range.

The one-trip travel distance is the distance the vehicle 1a traveled since the ignition was turned on until the ignition was turned off. The eco lamp lighting travel distance is the distance traveled within the one-trip travel distance, with the eco lamp 16b being on.

The travel distance within the HV eco zone range is the distance traveled in the on-trip travel distance with the eco lamp 16b being on, and the vehicle power indication status quantity being within the HV eco zone range. The travel distance beyond the HV eco zone range is the distance traveled within the one-trip travel distance, with the vehicle power indication status quantity being beyond the HV eco zone range.

Particularly, the travel distance beyond the HV eco zone range has weighting coefficients by which the respective travel distances in accordance with overruns beyond the HV eco zone are to be multiplied, as shown in a HV eco zone overrun rank weighting coefficient table illustrated in FIG. 7. In FIG. 7, the following relationship is established: $1<\alpha 1<\alpha 2<\alpha 3$. The travel distance beyond the HV eco zone range is calculated by: the overrun rank-A travel distance×$\alpha 1$+overrun rank-B travel distance×$\alpha 2$+overrun rank-C travel distance×$\alpha 3$. In this manner, as the overrun beyond the HV eco zone range becomes larger, the travel distance beyond the HV eco zone range is multiplied by a larger coefficient.

As described above, as the overrun rank becomes lower, the travel distance beyond the HV eco zone range is multiplied by a larger coefficient. Accordingly, a kind of a penalty is imposed on the driver, so that the driver can keep fuel-saving driving in mind.

Instead of the one-trip travel distance, it is possible to use a travel distance from a start to a stop. In this manner, driving can be examined more closely.

The fuel-saving driving rating unit 12 of the fuel-saving driving diagnostic device 10a rates the driving of the driver, based on the respective added-up values calculated by the travel distance adding-up unit 11e. For example, the score of an eco lamp lighting travel is calculated according to the following equation.

$$\text{Score of eco lamp lighting traveling} = \frac{\text{Eco lamp lighting travel distance}}{\text{One-trip travel distance}} \times 100[\%] \quad (2)$$

Also, according to the following formula, the score of traveling within the HV eco zone range is calculated.

$$\text{Score of traveling within } HV \text{ eco zone range} = \frac{\text{travel distance within } HV \text{ eco zone range}}{\text{One-trip travel distance}} \times 100[\%] \quad (3)$$

Further, according to the following formula, the score of traveling beyond the HV eco zone range is calculated.

$$\text{Score of traveling beyond } HV \text{ eco zone range} = \quad (4)$$
$$\frac{\text{Travel distance beyond } HV \text{ eco zone range}}{\text{One-trip travel distance}} =$$
$$(\text{Overrun rank} - A \text{ travel distance} \times \alpha 1 +$$
$$\text{Overrun rank} - B \text{ travel distance} \times \alpha 2 + \text{Overrun rank} -$$
$$C \text{ travel distance} \times \alpha 3)/\text{One-trip travel distance} \times 100[\%]$$

The score of an eco lamp lighting travel and the score of traveling within the HV eco zone range are "merit" scores for recognizing that the driver has performed fuel-saving driving. On the other hand, the score of traveling beyond the HV eco zone range is a "demerit" score for noting that the driver has failed to perform fuel-saving driving.

The fuel-saving driving rating unit 12 then causes the display unit 16c to display the score of an eco lamp lighting travel, the score of traveling within HV eco zone range, and the score of traveling beyond the HV eco zone range shown as an example in FIG. 14. Alternatively, a total score may be calculated, with the "merit" scores being point-addition components, the "demerit" score being a point-deduction component.

As described above, the fuel-saving driving of the driver is rated by calculating the respective scores based on the respective travel distances. In this manner, fair, clear, and satisfactory rating results can be presented to the driver.

The fuel-saving driving advice generating unit 13 of the fuel-saving driving diagnostic device 10*a* causes the display unit 16*c* to display fuel-saving driving advices illustrated as examples in FIG. 8, in accordance with the score of an eco lamp lighting travel and the score of traveling within the HV eco zone range. The fuel-saving driving advice generating unit 13 also causes the display unit 16*c* to display fuel-saving driving advices illustrated as examples in FIG. 9, in accordance with the score of traveling beyond the HV eco zone range. FIGS. 15 and 16 are diagrams each showing an exemplary display format in which the display unit 16*c* is caused to display a fuel-saving driving advice.

Alternatively, the fuel-saving driving advice generating unit 13 may generate a message from a message template promptly in response to any of the score of an eco lamp lighting travel, the score of traveling within the HV eco zone range, and score of traveling beyond the HV eco zone range.

Figure 10:
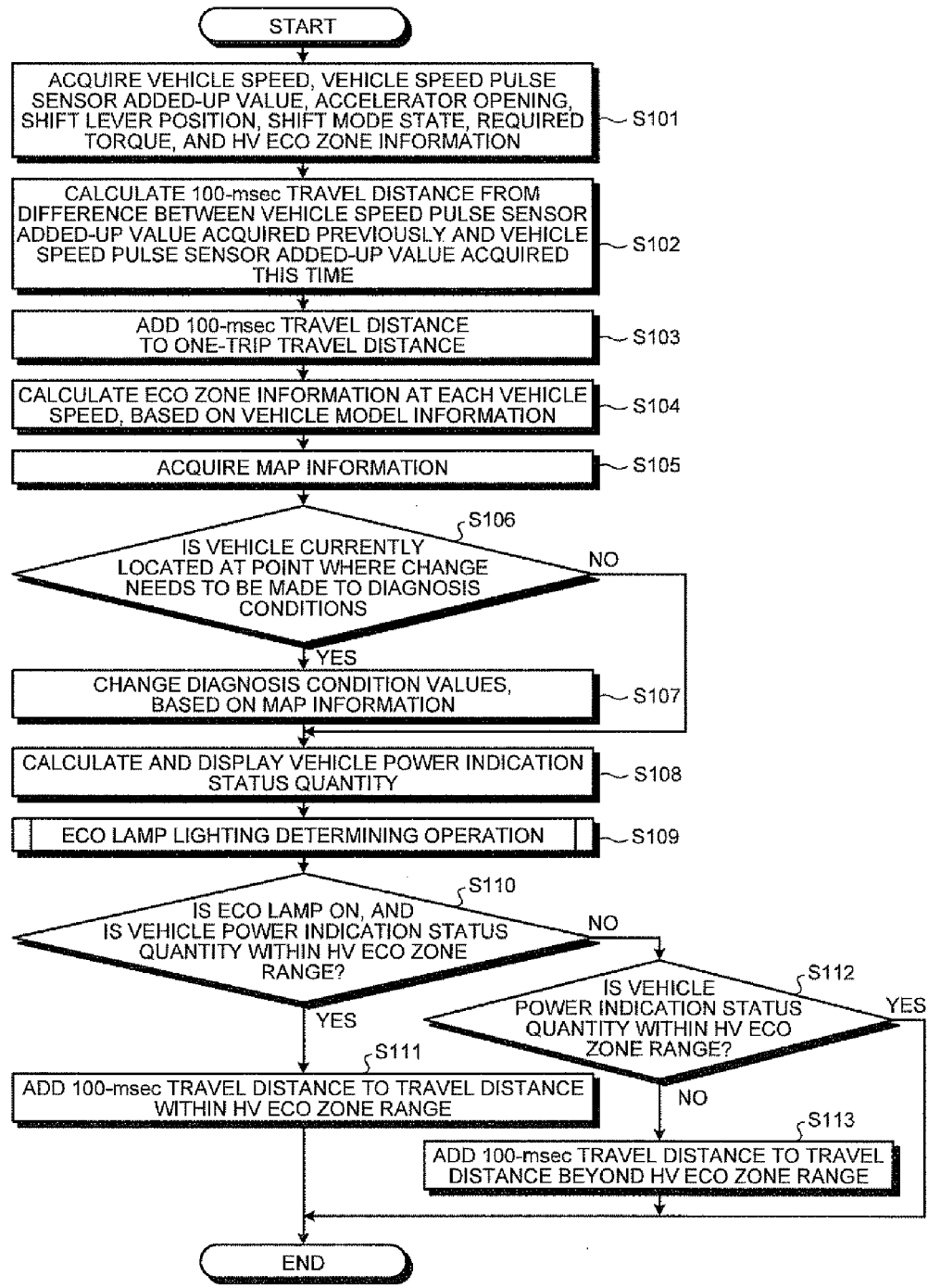
FIG. 10 is a flowchart illustrating the procedures in a fuel-saving driving diagnosing operation.

Next, a fuel-saving driving diagnosing operation to be performed by the fuel-saving driving diagnostic unit 11 of the fuel-saving driving diagnostic device 10*a* is described. FIG. 10 is a flowchart illustrating the procedures in the fuel-saving driving diagnosing operation. This operation is an operation to be performed every 100 milliseconds, for example. As illustrated in the figure, the diagnosis condition managing unit 11*a* first acquires the vehicle speed, the vehicle speed pulse sensor added-up value, the accelerator opening, the shift lever position, the shift mode state, the required torque, and the HV eco zone information from the HV traveling control device 20*a* (step S101).

The travel distance adding-up unit 11*e* then calculates the 100-msec travel distance from the difference between the vehicle speed pulse sensor added-up value acquired previously and the vehicle speed pulse sensor added-up value acquired this time (step S102). The travel distance adding-up unit 11*e* adds the 100-msec travel distance calculated at step S102 to the one-trip travel distance (step S103).

The eco zone information calculating unit 11*b* calculates the eco zone information at each vehicle speed, based on the vehicle model information (step S104). The diagnosis condition managing unit 11*a* acquires map information from the map information DB 17*a* (step S105).

Based on the acquired map information, the diagnosis condition managing unit 11*a* determines whether the current position of the vehicle is a point where a change needs to be made to the diagnosis conditions (step S106). If it is determined to be a point where a change needs to be made to the diagnosis conditions ("Yes" at step S106), the operation moves on to step S107. If it is determined not to be a point where a change needs to be made to the diagnosis conditions ("No" at step S106), the operation moves on to step S108.

At step S107, the diagnosis condition managing unit 11*a* changes the diagnosis conditions for fuel-saving driving, based on the acquired map information. At step S108, the vehicle power indication status quantity calculation determining unit 11*c* calculates the vehicle power indication status quantity, and displays the vehicle power indication status quantity on the vehicle power indication status quantity display unit 16*a*.

The eco lamp lighting determining unit 11*d* then performs an eco lamp lighting determining operation (step S109). The eco lamp lighting determining operation will be described later in detail, with reference to FIG. 11.

The vehicle power indication status quantity calculation determining unit 11*c* determines whether the eco lamp 16*b* is on, and the vehicle power indication status quantity is within the HV eco zone range (step S110). If the eco lamp 16*b* is determined to be on, and the vehicle power indication status quantity is determined to be within the HV eco zone range ("Yes" at step S110), the operation moves on to step S111. If the eco lamp 16*b* is determined not to be on, and the vehicle power indication status quantity is determined not to be within the HV eco zone range ("No" at step S110), the operation moves on to step S112.

At step S111, the travel distance adding-up unit 11*e* adds the 100-msec travel distance calculated at step S102 to the travel distance within the HV eco zone range. When this procedure is completed, the fuel-saving driving diagnosing operation comes to an end.

At step S112, the vehicle power indication status quantity calculation determining unit 11*c* determines whether the vehicle power indication status quantity is within the HV eco zone. If the vehicle power indication status quantity is determined to be within the HV eco zone range ("Yes" at step S112), the fuel-saving driving diagnosing operation comes to an end. If the vehicle power indication status quantity is determined not to be within the HV eco zone range ("No" at step S112), the 100-msec travel distance calculated at step S102 is added to the travel distance beyond the HV eco zone range (step S113). When this procedure is completed, the fuel-saving driving diagnosing operation comes to an end.

Figure 11:
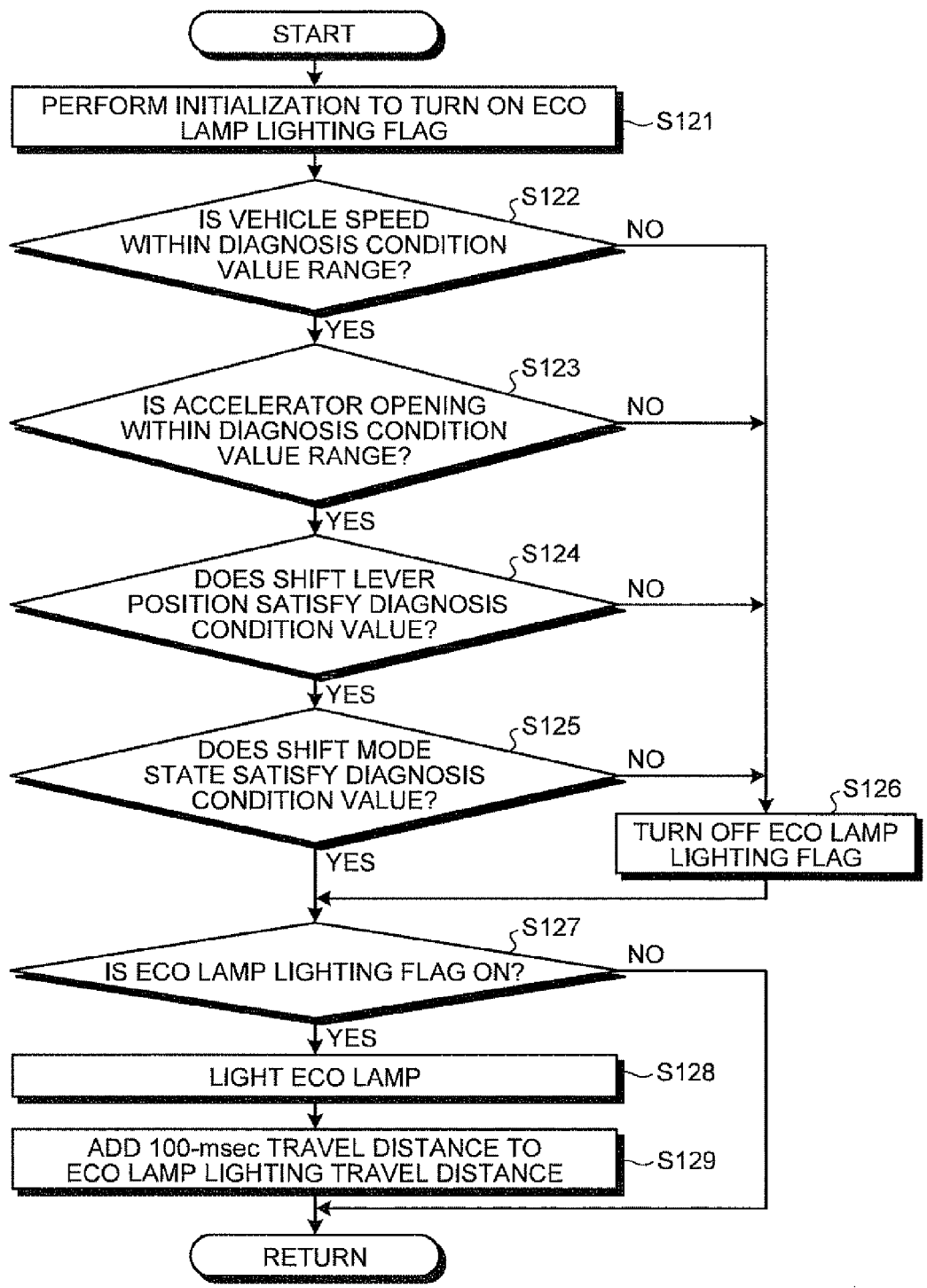
FIG. 11 is a flowchart illustrating the procedures in the eco lamp lighting determining operation.

Next, the eco lamp lighting determining operation depicted at S109 of FIG. 10 is described. FIG. 11 is a flowchart illustrating the procedures in the eco lamp lighting determining operation. As illustrated in the figure, the eco lamp lighting determining unit 11*d* first performs initialization to turn on an eco lamp lighting flag (step S121).

The eco lamp lighting determining unit 11*d* then determines whether the vehicle speed is within a diagnosis condition value range (step S122). If the vehicle speed is determined to be within the diagnosis condition value range ("Yes" at step S122), the operation moves on to step S123. If the vehicle speed is determined not to be within the diagnosis condition value range ("No" at step S122), the operation moves on to step S126.

The eco lamp lighting determining unit 11*d* then determines whether the accelerator opening is within a diagnosis condition value range (step S123). If the accelerator opening is determined to be within the diagnosis condition value range ("Yes" at step S123), the operation moves on to step S124. If the accelerator opening is determined not to be within the diagnosis condition value range ("No" at step S123), the operation moves on to step S126.

The eco lamp lighting determining unit 11*d* then determines whether the shift lever position satisfies a diagnosis condition value (step S124). If the shift lever position is determined to satisfy a diagnosis condition value ("Yes" at step S124), the operation moves on to step S125. If the shift lever position is determined not to satisfy a diagnosis condition value ("No" at step S124), the operation moves on to step S126.

The eco lamp lighting determining unit 11*d* then determines whether the shift mode state satisfies a diagnosis condition value (step S125). If the shift mode state is determined to satisfy a diagnosis condition value ("Yes" at step S125), the operation moves on to step S127. If the shift lever position is determined not to satisfy a diagnosis condition value ("No" at step S125), the operation moves on to step S126.

At step S126, the eco lamp lighting determining unit 11*d* turns the eco lamp lighting flag off. At step S127, the eco lamp lighting determining unit 11*d* determines whether the eco lamp lighting flag is on. If the eco lamp lighting flag is determined to be on ("Yes" at step S127), the eco lamp lighting determining unit 11*d* lights an eco lamp 16*d* (step S128), and adds the 100-msec travel distance calculated at step S102 of FIG. 10 to the eco lamp lighting travel distance (step S129).

If the eco lamp lighting flag is determined not to be on ("No" at step S127), the eco lamp lighting determining operation comes to an end.

Figure 12:
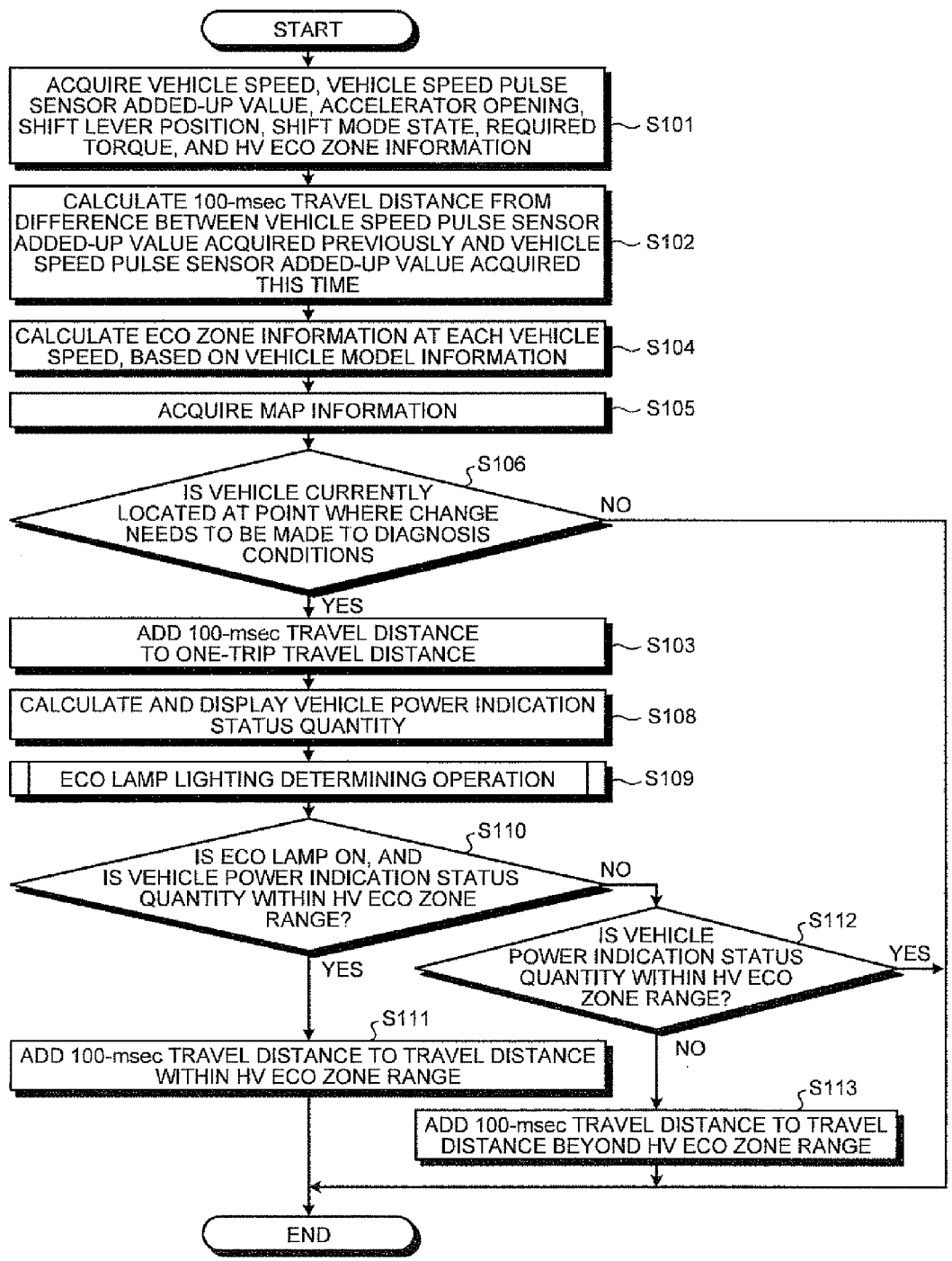
FIG. 12 is a flowchart illustrating the procedures in a fuel-saving driving diagnosing operation as an example of a modification of the embodiment.

In the fuel-saving driving diagnosing operation depicted in FIG. 10, the diagnosis conditions are changed before a fuel-saving driving diagnosis is made when the current position of the vehicle is a point where a change needs to be made to the diagnosis conditions. Alternatively, step S104 may be carried out after step S102, and step S103 may be carried out if the determination result of step S106 is positive, as illustrated in FIG. 12, with like step numbers being allotted to like procedures. After step S103 is carried out, steps S108 through S113 are carried out. If the determination result of step S106 is negative, the fuel-saving driving diagnosing operation is immediately performed.

In other words, in the fuel-saving driving diagnosing operation illustrated in FIG. 12, a diagnosis is not made when the current position of the vehicle is a point where a change needs to be made to the diagnosis conditions, and the 100-msec travel distance is not added to either of the one-trip travel distance and the travel distance within the HV eco zone range. In this manner, a fair fuel-saving driving diagnosis can be made, with the driving conditions of the vehicle 1*a* and the traffic conditions and the like being taken into consideration.

Figure 13:
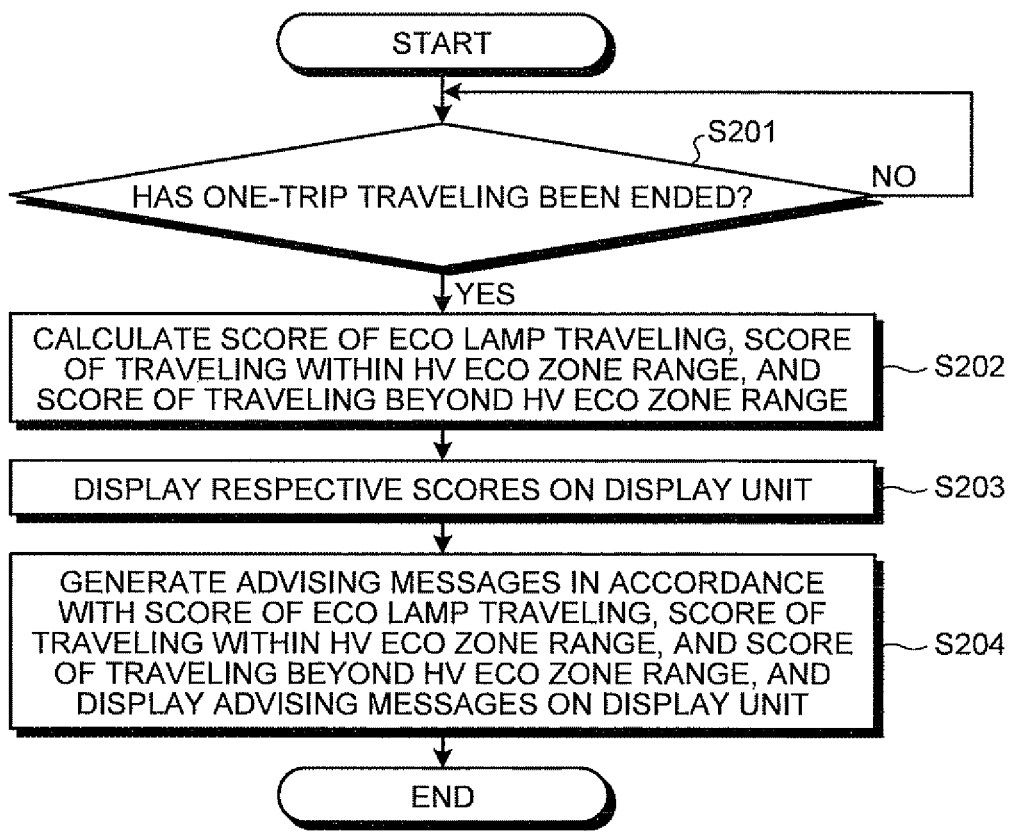
FIG. 13 is a flowchart illustrating the procedures in a fuel-saving driving rating result advice notifying operation.

Next, a fuel-saving driving rating result advice notifying operation to be performed by the fuel-saving driving rating unit 12 and the fuel-saving driving advice generating unit 13 of the fuel-saving driving diagnostic device 10*a* is described. FIG. 13 is a flowchart illustrating the procedures in the fuel-saving driving rating result advice notifying operation. As illustrated in the figure, the fuel-saving driving rating unit 12 first determines whether one-trip traveling has been ended (step S201). If one-trip traveling is determined to have been ended ("Yes" at step S201), the operation moves on to step S202. If one-trip traveling is determined not to have been ended ("No" at step S201), step S201 is repeated.

At step S202, the fuel-saving driving rating unit 12 calculates an eco lamp lighting score, a score of traveling within the HV eco zone range, and a score of traveling beyond the HV eco zone range, based on the above described equations (2) through (4).

The fuel-saving driving rating unit 12 then causes the display unit 16*c* to display the respective scores calculated through the procedures of step S202 (step S203). The fuel-saving driving advice generating unit 13 then causes the display unit 16*c* to display advising messages to increase the driver's awareness about fuel-saving driving in accordance with the eco lamp lighting score, the score of traveling within the HV eco zone range, and the score of traveling beyond the HV eco zone range (step S204). When this procedures is completed, the fuel-saving driving rating result advice notifying operation comes to an end.

As described above, the rating results and the fuel-saving driving advices are presented to the driver. In this manner, the driver's awareness about fuel-saving driving can be raised and increased, and the driver can perform driving by sufficiently taking advantage of the environmental design of a hybrid vehicle.

Figure 17:
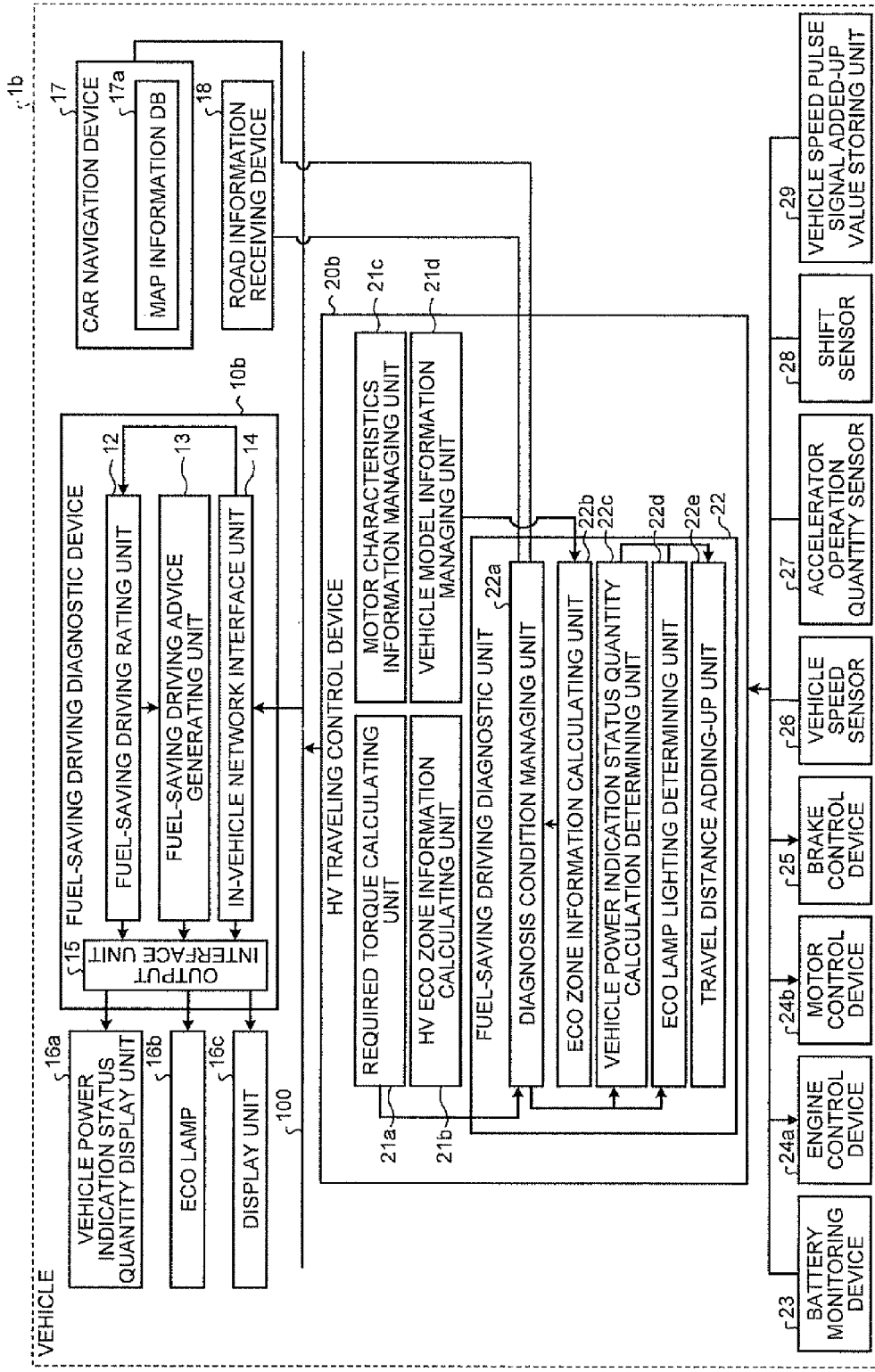
FIG. 17 is a functional block diagram illustrating the structures of components related to a fuel-saving driving diagnostic device and a HV traveling control device according to an example of a modification of the embodiment.

As illustrated in the structures of a fuel-saving driving diagnostic device 10*b* and a HV traveling control device 20*b* of a vehicle 1*b* in FIG. 17, the HV traveling control device 20*b* may include a fuel-saving driving diagnostic unit 22, instead of the fuel-saving driving diagnostic device 10*a* including the fuel-saving driving diagnostic unit 11 in the vehicle 1*a* shown in FIG. 3. In this case, only the structures of the fuel-saving driving diagnostic device and the HV traveling control device differ from those of the above described embodiment, and the other aspects are the same as those of the above described embodiment. With this arrangement, the structure of the fuel-saving driving diagnostic device 10*b* can be simplified, and the processing load can be reduced.

It should be noted that a diagnosis condition managing unit 22*a*, an eco zone information calculating unit 22*b*, a vehicle power indication status quantity calculation determining unit 22*c*, an eco lamp lighting determining unit 22*d*, and a travel distance adding-up unit 22*e* of the fuel-saving driving diagnostic unit 22 have the same functional structures as the diagnosis condition managing unit 11*a*, the eco zone information calculating unit 11*b*, the vehicle power indication status quantity calculation determining unit 11*c*, the eco lamp lighting determining unit 11*d*, and the travel distance adding-up unit 11*e* of the fuel-saving driving diagnostic unit 11, respectively. The eco lamp lighting determining unit 22*d* and/or the travel distance adding-up unit 22*e* may be included in the fuel-saving driving diagnostic device 10*b*, instead of the fuel-saving driving diagnostic unit 22.

Although an example of an embodiment of the present invention has been described so far, the present invention is not limited to that, and other various embodiments may be formed within scope of the technical spirit claimed in the invention. Also, advantages of the above example of an embodiment are not limited to those described above.

More specifically, the vehicle power indication status quantity may be diagnosed and rated, before the eco lamp 16*b* is lighted. When the vehicle goes uphill or downhill, the conditions for diagnosing the vehicle power indication status quantity may be changed only with respect to the gravity to which the vehicle 1*a* is more subjected than in the case of flatland traveling. In that case, it is possible to use a gravity sensor, instead of the map information DB 17*a*.

The values of conditions for diagnosing the vehicle power indication status quantity may be changed, with the weight of the passengers or cargo on board or the like being taken into account. The vehicle power indication status quantity may be then diagnosed and rated.

When driving using only charging power is performed with the required torque staying within the HV eco zone range, a score may be increased at the time of rating. Also, at the time of rating, the weighting of the score may be changed in accordance with the usage rate of the charging power used for generating the required torque.

The method for notifying the vehicle driver of the result of rating or an advice is not limited to displaying on the display unit 16*c*, but may involve acoustic or audio means.

According to the above described example of an embodiment, the conditions for diagnosing fuel-saving driving are relaxed or tightened by taking into consideration the driving conditions of the vehicle. Accordingly, the precision of fuel-saving driving diagnoses can be made higher, and the accuracy of fuel-saving driving rating can also be made higher.

Also, in the above described example of an embodiment, fair fuel-saving driving diagnoses are made by relaxing or tightening the predetermined fuel-saving driving diagnosis conditions, based on road conditions, traffic conditions, road surface conditions, weather conditions, or the like. However, the present invention is not limited to that. Fuel-saving driving diagnosis conditions may be generated based on road conditions, traffic conditions, road surface conditions, weather conditions, or the like. Based on the generated fuel-saving driving diagnosis conditions, fuel-saving driving diagnoses may be made. Further, appropriate fuel-saving driving diagnosis conditions may be selected from the generated fuel-saving driving diagnosis conditions. Based on the selected fuel-saving driving diagnosis conditions, fuel-saving driving diagnoses may be made. In this manner, fairer fuel-saving driving diagnoses can be made, based on flexible fuel-saving driving diagnosis conditions varying with situations, instead of fixed fuel-saving driving diagnosis conditions.

In the respective procedures described in the above described example of an embodiment, all of or some of the procedures described as procedures to be automatically carried out may be manually carried out, or all of or some of the procedures described as procedures to be manually carried out may be automatically carried out in a known manner. Other than that, arbitrary changes may be made to the operation sequences, control sequences, specific names, and information containing various kinds of data and parameters described in the above example of an embodiment.

Also, each of the components of each device shown in the drawings is merely functional and conceptual, and does not need to be physically structured as in the drawings. Specifically, specific forms of separations and combinations of the devices are not limited to those shown in the drawings, but all of or part of them may be functionally or physically divided or integrated by an arbitrary unit, in accordance with various kinds of loads and the usage conditions.

Further, all of or arbitrary part of each processing function to be carried out in each device may be realized by a CPU (Central Processing Unit) (or a microcomputer such as a MPU (Micro Processing Unit) or a MCU (Micro Controller Unit)), or a program to be analyzed and executed by a CPU (or a microcomputer such as a MPU or MCU), or may be realized as hardware formed with wired logics.

INDUSTRIAL APPLICABILITY

The disclosed fuel-saving driving diagnostic device, the fuel-saving driving diagnostic system, and the fuel-saving driving diagnostic method are effective to increase the driver's awareness about fuel-saving driving, particularly fuel-saving acceleration and deceleration in driving, by diagnosing eco-friendly driving of the driver of the vehicle, rating the driving based on the diagnosis result, and returning the rating result and a fuel-saving driving advice based on the rating result to the driver.

EXPLANATIONS OF LETTERS OR NUMERALS 1a, 1b Vehicle
10a, 10b Fuel-saving driving diagnostic device
11 Fuel-saving driving diagnostic unit
11a Diagnosis condition managing unit
11b Eco zone information calculating unit
11c Vehicle power indication status quantity calculation determining unit
11d Eco lamp lighting determining unit
11e Travel distance adding-up unit
12 Fuel-saving driving rating unit
13 Fuel-saving driving advice generating unit
14 In-vehicle network interface unit
15 Output interface unit
16a Vehicle power indication status quantity display unit
16b Eco lamp
16c Display unit
17 Car navigation device
17a Map information DB
18 Road information receiving device
20a, 20b HV traveling control device
21a Required torque calculating unit
21b HV eco zone information calculating unit
21c Motor characteristics information managing unit
21d Vehicle model information managing unit
22 Fuel-saving driving diagnostic unit
22a Diagnosis condition managing unit
22b Eco zone information calculating unit
22c Vehicle power indication status quantity calculation determining unit
22d Eco lamp lighting determining unit
22e Travel distance adding-up unit
23 Battery monitoring device
24a Engine control device
24b Motor control device
25 Brake control device
26 Vehicle speed sensor
27 Accelerator operation quantity sensor
28 Shift sensor
29 Vehicle speed pulse signal added-up value storing unit
100 In-vehicle network
501 Eco zone
502 HV eco zone
503 Maximum display status quantity
504 Vehicle power indication status quantity non-eco zone
505 Vehicle power indication status quantity

The invention claimed is:

1. A fuel-saving driving diagnostic device that diagnoses fuel-saving driving of a vehicle that has an internal combustion engine for driving the vehicle and an electric drive device for driving the vehicle using electricity as energy, comprising:
   a control value acquiring unit that acquires a control value based on a driving operation performed on the vehicle;
   a first eco range output unit that outputs a first eco range that indicates a relationship between an upper limit threshold value of the control value and a vehicle speed of the vehicle, the upper limit threshold value of the control value being a boundary between eco driving and non-eco driving with respect to the entire vehicle;
   a second eco range output unit that outputs a second eco range that indicates a relationship among an upper limit threshold value of the control value, performance characteristics of the electric drive device, and the vehicle speed of the vehicle, the upper limit threshold value of the control value being a boundary between eco driving and non-eco driving with respect to the electric drive device;
   a determining unit that determines whether the control value acquired by the control value acquiring unit is within the first eco range, and determines whether the control value is within the second eco range; and
   a presenting unit that presents a result of the determinations made by the determining unit with respect to the first eco range and the second eco range.

2. The fuel-saving driving diagnostic device according to claim 1, wherein
   the first eco range output unit and the second eco range output unit change the upper limit threshold values of the control value in accordance with road conditions or traffic conditions acquired by a road and traffic condition acquiring device that acquires the road conditions or the traffic conditions.

3. The fuel-saving driving diagnostic device according to claim 1, wherein
   the determining unit cancels determining operations to be performed to determine whether the control value acquired by the control value acquiring unit is within the first eco range and determine whether the control value is within the second eco range, based on road conditions or traffic conditions acquired by a road and traffic condition acquiring device that acquires the road conditions or the traffic conditions.

4. The fuel-saving driving diagnostic device according to claim 1, wherein
the determining unit cancels determining operations to be performed to determine whether the control value acquired by the control value acquiring unit is within the first eco range and determine whether the control value is within the second eco range, based on map information.

5. The fuel-saving driving diagnostic device according to claim 1, further comprising
a fuel-saving driving rating unit that rates fuel-saving driving, based on a total travel distance the vehicle travels while the determining unit is determining whether the control value is within the first eco range and is determining whether the control value is within the second eco range, and a travel distance over which the control value is determined to be within the first eco range and the second eco range by the determining unit, the travel distance being part of the total travel distance.

6. The fuel-saving driving diagnostic device according to claim 5, further comprising
an advice generating unit that generates a fuel-saving driving advice, based on a result of the rating performed by the fuel-saving driving rating unit.

7. The fuel-saving driving diagnostic device according to claim 6, wherein
the presenting unit presents a result of rating performed by the fuel-saving driving rating unit or a fuel-saving driving advice generated by the advice generating unit.

8. A fuel-saving driving diagnostic system that diagnoses fuel-saving driving of a vehicle that has an internal combustion engine for driving the vehicle and an electric drive device for driving the vehicle using electricity as energy, comprising:
a control device of the electric drive device that includes: a control value acquiring unit that acquires a control value based on a driving operation performed on the vehicle; a first eco range output unit that outputs a first eco range that indicates a relationship between an upper limit threshold value of the control value and a vehicle speed of the vehicle, the upper limit threshold value of the control value being a boundary between eco driving and non-eco driving with respect to the entire vehicle; a second eco range output unit that outputs a second eco range that indicates a relationship among an upper limit threshold value of the control value, performance characteristics of the electric drive device, and the vehicle speed of the vehicle, the upper limit threshold value of the control value being a boundary between eco driving and non-eco driving with respect to the electric drive device; and a determining unit that determines whether the control value acquired by the control value acquiring unit is within the first eco range, and determines whether the control value is within the second eco range; and
a fuel-saving driving rating device that includes a fuel-saving driving rating unit that rates fuel-saving driving, based on a total travel distance the vehicle travels while the determining unit is determining whether the control value is within the first eco range and is determining whether the control value is within the second eco range, and a travel distance over which the control value is determined to be within the first eco range and the second eco range by the determining unit, the travel distance being part of the total travel distance.

9. A control device of an electric drive device that controls the electric drive device for driving a vehicle, which has an internal combustion engine for driving the vehicle, using electricity as energy and diagnoses fuel-saving driving of the vehicle, comprising:
a control value acquiring unit that acquires a control value based on a driving operation performed on the vehicle;
a first eco range output unit that outputs a first eco range that indicates a relationship between an upper limit threshold value of the control value and a vehicle speed of the vehicle, the upper limit threshold value of the control value being a boundary between eco driving and non-eco driving with respect to the entire vehicle;
a second eco range output unit that outputs a second eco range that indicates a relationship among an upper limit threshold value of the control value, performance characteristics of the electric drive device, and the vehicle speed of the vehicle, the upper limit threshold value of the control value being a boundary between eco driving and non-eco driving with respect to the electric drive device; and
a determining unit that determines whether the control value acquired by the control value acquiring unit is within the first eco range, and determines whether the control value is within the second eco range.

* * * * *